United States Patent [19]

Kremer

[11] Patent Number: 5,176,847
[45] Date of Patent: Jan. 5, 1993

[54] DEMULSIFYING COMPOSITION

[75] Inventor: Lawrence N. Kremer, Woodlands, Tex.

[73] Assignee: Baker Hughes Incorporated, Houston, Tex.

[21] Appl. No.: 526,420

[22] Filed: May 22, 1990

Related U.S. Application Data

[63] Continuation-in-part of Ser. No. 293,920, Jan. 6, 1989, abandoned.

[51] Int. Cl.⁵ .............................................. B01D 17/05
[52] U.S. Cl. .................................... 252/358; 252/342; 252/344; 208/188; 210/708
[58] Field of Search ....................... 252/342, 344, 358; 210/708; 208/188

[56] References Cited

U.S. PATENT DOCUMENTS

| | | | |
|---|---|---|---|
| 3,186,951 | 6/1965 | DeGroote et al. | 252/331 |
| 4,209,422 | 6/1980 | Zimmerman et al. | 252/344 |
| 4,321,147 | 3/1982 | McCoy et al. | 210/708 |
| 4,384,977 | 5/1983 | Duke | 252/344 |
| 4,474,682 | 10/1984 | Billenstein et al. | 252/358 X |
| 4,558,080 | 12/1985 | Quamme et al. | 210/723 X |
| 4,948,513 | 8/1990 | Mitchell | 210/705 |

OTHER PUBLICATIONS

Derwent Abstract, 77-10041Y/06 (Abstract of JP 82 052880).

Primary Examiner—Robert L. Stoll
Assistant Examiner—Daniel S. Metzmaier
Attorney, Agent, or Firm—David Mossman

[57] ABSTRACT

Water-in-oil emulsions of the type found in petroleum oil refineries and other industrial operations are demulsified by adding thereto an effective amount of a mixture of these components comprising 1. Tannin or amino methylated tannin
2. A cationic polymer or blend of such polymers
3. An alkoxylated triamino methane or other polyfunctional amines or hydroxy compounds.

5 Claims, No Drawings

DEMULSIFYING COMPOSITION

This application is a continuation-in-part of Ser. No. 07/293,920 filed Jan. 6, 1989, now abandoned.

FIELD OF THE INVENTION

The present invention pertains to methods and compositions useful for demulsifying water-in-oil emulsions of the type found in petroleum refineries and in other industrial processes.

BACKGROUND OF THE INVENTION

Many petroleum oil refineries employ so-called desalters wherein crude oil mixed with water, which may or may not contain a number of chemicals, is treated in order to remove the water from the oil and to extract from the oil or oil emulsified with water (from the oil-producing formation) various salts and/or metal values or compounds contained therein. These metal compounds may include iron, vanadium and nickel compounds which can poison expensive FCCU (fluid catalytic cracking unit) catalysts used in cracking fractions or portions (usually distillates) of the oil.

Other oil refinery operations produce so-called slop oil emulsions which must be demulsified to remove water and/or contaminants before such oils can be further processed or blended for sale.

Other industrial operations, including steel mills and many chemical plants, produce water-in-oil emulsions which are difficult to break.

A number of methods and chemical compositions have been employed to break the foregoing type emulsions, with varying results. The emulsions either take too long a time to break, resulting in a 'bottleneck' in the refinery or other industrial processes, or they do not break cleanly resulting in troublesome interfacial problems.

Some oil refineries have previously used high molecular weight polymers in petroleum oil desalting units but with poor results. For example, copolymers of polypropylene glycol and ethylene oxide have been used. (Pet. Products Handbook—Guthrie (McGraw-Hill Book Co., 1960).

SUMMARY OF THE INVENTION

The present invention provides compositions and method for demulsifying water-in-oil emulsions which frequently occur in the desalting of crude petroleum oil or fractions thereof prior to refining, and which also occur in other industrial processes such as in steel mills and chemical plants. I have found that such emulsions can be demulsified by appropriately contacting the emulsions with an effective amount of a three component mixture consisting essentially of (1) Tannin or amino methylated tannin (2) A cationic polymer or blend of such polymers. These cationic polymers are either polyamines or polyquarternary amines.

(3) A compound having the structure of

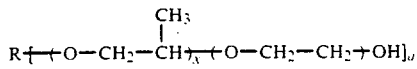

where
a is 3 or more
x is between 60 and 200
y is between 20 and 100

R is a poly functional group such as tris hydroxymethylaminomethane, triethanolamine, glycerine, triethylenetetramine, or sorbitol.

The ethylene oxide and propylene oxide can be added as either block or random polymers. When OH groups are available the ethylene oxide and propylene oxides add by forming ether linkages and result in another terminal OH being formed. Thus numerous alkoxide groups can be added. Alkylene oxides can also add to amine groups in which the case of the following reaction would occur:

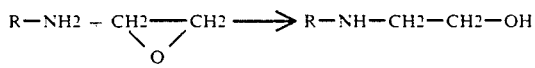

The terminal OH group can then further react with the alkylene oxide to add several repeating units until a structure like (3) above is formed.

The products and method are particularly useful in reducing or removing iron, and other metal values that may be present as sulfides or other compounds in water-in-oil emulsions of petroleum oil with water, by the so-called desalting process. These compounds must be removed from petroleum fractions used as feed stock to FCC units because they poison the catalysts used therein.

The product and method are also useful in demulsifying water-in-oil emulsions found in oil refineries and known as slop oils, and other troublesome emulsions found in steel mills and chemical plants such as in the manufacture of ethylene dichloride wherein the caustic wash of this product produces troublesome emulsions.

DETAILED DESCRIPTION AND PREFERRED EMBODIMENTS

In demulsifying emulsions produced in petroleum oil (or petroleum oil fractions), the treatment of the emulsion with the above mixtures, preferably as an aqueous solution or suspension thereof, causes the emulsion to break and separate into two layers. It is believed that the mechanism of action involves the removal of solids, and in particular metal or iron sulfide particles, from the interfacial area of the emulsion, thereby causing destabilization.

This invention provides products and methods to break water-in-oil emulsions of the type, and for the purposes previously described herein. The products comprise a three component mixture consisting essentially of 1. Tannin or amino methylated tannin 2. A cationic polymer or blend of such polymers. These cationic polymers are either polyamines or poly quarternary amines.

3. A compound having the structure of

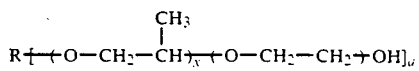

where
a is 3 or more
x is between 60 and 200
y is between 20 and 100

R is a poly functional group such as tris hydroxymethylaminomethane, triethanolamine, glycerine, alkylene polyamines, or sorbitol.

The ethylene oxide and propylene oxide can be added as either block or random polymers. When OH groups are available the ethylene oxide and propylene oxides add by forming ether linkages and result in another terminal OH being formed. Thus numerous alkoxide groups can be added. Alkylene oxides can also add to amine groups in which the case the following reaction would occur:

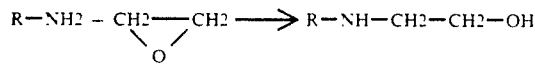

The terminal OH group can then further react with the alkylene oxide to add several repeating units until a structure like (3) is formed.

The tannin component can be any water soluble commercial tannin product or it can be made cationic by reaction with monoethanolamine and formaldehyde (Mannich reaction). These are equivalent in function for purposes of the invention.

The cationic polymer component may be a polyamine of the type poly $(CH_2-CH_2-NH)-$, formed by the reaction of 1,2 dichloroethane with 1,2 diaminoethane; or a poly quaternary amine of the type poly $-[-CH_2-CHOH-CH_2-N(CH_3)_2^+-]-$ $Cl-$ formed by the reaction of epichlorohydrin with dimethylamine; or a poly quaternary amine formed by polymerizing dimethylamine allyl chloride. These polymers and methods for manufacturing them are well known in the art. Small amounts of known cross linking agents can be used during polymerization to increase molecular weight. Polymers of this type having molecular weights from 30,000 to 5 million, and even some up to 10 million, are useful.

In particular, cationic polymer components that are useful in the mixture of the invention are
  Group 1. polyamines formed by the reaction of 1,2 dichlorethane with 1,2 diaminoethane having the general formula poly $(-CH_2-CH_2-NH)-$
  Group 2. polyamines formed by reacting epichlorohydrin with dimethylamine. Cross linking agents can be added in small amount to increase molecular weight. The final product is a quaternary amine polymer with the formula $-[-CH_2-CHOH-CH_2-N(CH_3)_2^+-]- Cl-$
  Group 3. polymers produced by polymerizing dimethylamine allyl chloride The third component in the product mixture of the invention is preferably an alkoxylated compound of the type represented by

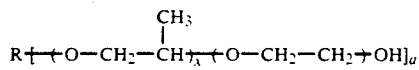

where
  a is 3 or more
  x is between 60 and 200
  y is between 20 and 100
  R is a poly functional group such as trishydroxymethylaminomethane, triethanolamine, glycerine, triethylenetetraamine, other alkylene polyamines, sorbitol, and other polyols.

A preferred procedure is the addition of a mixture of compounds taken from Groups 1, 2 and 3 above in a weight ratio of 1:1:10, or by using an aqueous solution made by dissolving 1 part of such a mixture ratio in 3 parts of water.

Variations of ratios of these mixtures contemplated within the scope of the invention are as follows:
  Components 1 and 2, from 0.1 to 2 parts
  Component 3, from 5.0 to 15 parts
  Water up to 95 parts I have found that water solutions of the mixture of the invention can be stabilized to avoid precipitation in storage or during use by acidifying the product solution to adjust the pH thereof to within a range of 2 to 6, preferably 4. Organic acids such as acetic acid (or acetic anhydride) are preferred but inorganic acids such as sulfuric, hydrochloric and phosphoric acids can be used. Use of the acids for pH adjustment of the solution is also advantageous in oil desalting operations since it can help prevent saponification when alkaline wash waters are used.

The amount of water used in making up a solution of the product of the invention may be varied considerably, i.e., from 2 to 10 parts of water to 1 part of a mixture of the components.

The amount of the product of the invention which is effective to break the water-in-oil emulsions described herein can be from 1 ppm to 100 ppm for desalter applications and from 25 to 5000 ppm in waste oil applications, depending on the nature of the emulsion and the equipment and conditions employed to break the emulsion.

In a preferred embodiment the product mixture of the invention consists of 1 part of tannin, 1 part of a polyamine from Group 2 (polymer formed by reacting epichlorohydrin with dimethylamine) and 10 parts of a Group 3 compound prepared by polymerizing a mixture of about 1 part by weight of tris hydroxymethylaminomethane, 66 parts propylene oxide and 27 par ethylene oxide. This product is soluble in both oil and water and is represented by the formula $R-[(OCH_2CHCH_3)_x-(OCH_2CH_2)_y-OH]_3$ where R is tris hydroxymethylaminomethane and $x=118$ and $y=63$.

The above product mixture (15 ppm) can be added directly to a water-in-oil emulsion of the type described herein or it can be dissolved in 3 parts of water and used as a solution. For stabilization and for other reasons previously discussed, the pH of the solution may be adjusted to within the range of 3 to 6, preferably 4. The emulsions break or destabilize in a considerably shorter time than when prior art compounds are used for this purpose.

EXAMPLE 1

A desalter in a West Coast Refinery processing heavy crude (API) in the 18-24 range) had built up a large oil continuous emulsion band between the oil and water layers. Traditional emulsion breaker chemicals could not break this emulsion. Samples of the emulsion were taken out of the desalter through a sample tap and placed in pretreated bottles. The glass sample bottles were shaken 20 times and then visually inspected to determine how much water would then separate into a distinct layer on the bottom of the oil phase. Any other changes were also noted.

It sometimes occurs in emulsion breaking that water will be released from the oil but that the water droplets will not settle to the bottom. This case is called break but no separation. If the water will not separate from the oil phase it is not a practical treatment.

The following tables give the compounds which were tested and the formulations which were made with these compounds and tested on the desalter emulsion band samples. Compound A is included as one type of component 1. Compound B and compound D are examples of the component 2. Compound C is included in component 3. Tests 9, 11, and 13 are examples of the preferred embodiment of the mixture. These three tests produced excellent emulsion breaks and separation of water. These three breaks were at least twice as good as anything else tested. For comparison blanks were run in between each of these successful breaks (i.e. 10, 12 and 14).

Tests 1, 2, 4, 5, 6 and 8 show that the individual components are not effective in breaking the emulsion. Test 3 and 7 contain only two of the tree claimed components and are ineffective. Thus there is a synergistic effect obtained by mixing these three components. The combination of three components is needed to break the emulsion.

Compound A—Amino methylated tannin (component 1)
Compound B—Polyamine type low molecular weight cationic polymer (component 2)
Compound C—Alkoxylated tris hydroxymethylaminomethane (component 3)
Compound D—High molecular weight (about 4–7 millions AU) cationic polymer (component 2)
Compound E—Alfonic 1412 A (ammonium salt of alcohol ether sulfate sufactant)

| Test | | Testing |
|---|---|---|
| | Blank | 20% water separated |
| 1 | 1000 ppm C | 20% water separated |
| 2 | 500 ppm B | 20% water separated |
| 3 | 500 ppm B | 20% water separated |
| | 1000 ppm C | |
| 4 | 2000 ppm C | 20% water separated |
| 5 | 1000 ppm A | Red solid precipitation no water break |
| 6 | 20 ppm D | Break but no separation |
| 7 | 1000 ppm C | Red solid precipitate |
| | 500 ppm E | Water break but no |
| | 500 ppm A | separation |
| 8 | 500 ppm A | Red solid precipitate no water separation |
| 9 | 500 ppm A | 55% oil, 45% water |
| | 250 ppm C | |
| | 5 ppm B | |
| 10 | No treatment | 80% emulsion, 20% water |
| 11 | 500 ppm A | 57% oil, 29% water |
| | 5 ppm B | |
| | 250 ppm C | |
| 12 | No treatment | 71% emulsion, 29% water |
| 13 | 500 ppm A | 54% oil, 46% water |
| | 5 ppm B | |
| | 250 ppm C | |

EXAMPLE 2

The following mixture was made:

| Tannin (component 2) | 1% |
|---|---|
| EPI/DMA copolymer amine (component 2) | 8% |
| Alkoxylated tris hydroxy methyl aminomethane | 4% |

This mixture was used to rapidly break an emulsion of water in ethylene dichloride at concentrations of 1 to 30 ppm by weight. Several traditional demulsifiers were tried without success.

What is claimed is:

1. A composition useful for demulsifying oil-in-water emulsions which comprises a water soluble mixture consisting essentially of:
   1) tannin or amino methylated tannin,
   2) at least one cationic polymer selected from the group consisting of:
      a) polyamines formed by the reaction of 1,2-dichloroethane with 1,2-diaminoethane containing a plurality of groups of the formula —(—CH$_2$—CH$_2$—NH)—;
      b) polyamines formed by the reaction of epichlorohydrin and dimethylamine containing a plurality of groups of the formula —[—CH$_2$—CHOH—CH$_2$—N(CH$_3$)$_2$+—]— $Cl-$;
      c) polymers formed by polymerizing dimethylamine allyl chloride; and mixtures thereof, and
   3) a water soluble compound represented by

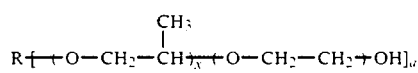

where
a is 3 or more,
x is from 60 to 200,
y is from 20 to 100 and
R is a polyfunctional group selected from the group consisting of alkylene polyamines and polyols.

2. The composition of claim 1 wherein R is an alkylene polyamine.

3. The composition of claim 1 wherein R is a polyol.

4. The composition of claim 1 wherein x is about 118 and y is about 63.

5. A composition useful for demulsifying oil-in-water emulsions which comprises a water soluble mixture consisting essentially of:
   1) tannin or amino methylated tannin,
   2) at least one cationic polymer selected from the group consisting of:
      a) polyamines formed by the reaction of 1,2-dichloroethane with 1,2-diaminoethane containing a plurality of groups of the formula —(—CH$_2$—CH$_2$—NH)—;
      b) polyamines formed by the reaction of epichlorohydrin and dimethylamine containing a plurality of groups of the formula —[—CH$_2$—CHOH—CH$_2$—N(CH$_3$)$_2$+—]— $Cl-$;
      c) polymers formed by polymerizing dimethylamine allyl chloride; and mixtures thereof, and
   3) a water soluble compound represented by

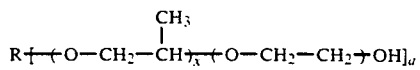

where
a is 3 or more,
x is about 118,
y is about 63 and
R is a polyfunctional group selected from the group consisting of tris hydroxymethylaminomethane, triethanolamine, glycerine, triethylenetetramine and sorbitol.

* * * * *